(12) United States Patent
Luk et al.

(10) Patent No.: US 8,291,146 B2
(45) Date of Patent: Oct. 16, 2012

(54) SYSTEM AND METHOD FOR ACCESSING RESOURCES OF A PCI EXPRESS COMPLIANT DEVICE

(75) Inventors: Betty Luk, San Francisco, CA (US); Gordon F. Caruk, Brampton (CA)

(73) Assignees: ATI Technologies ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 167 days.

(21) Appl. No.: 12/836,731

(22) Filed: Jul. 15, 2010

(65) Prior Publication Data
US 2012/0017025 A1    Jan. 19, 2012

(51) Int. Cl.
*G06F 13/20* (2006.01)
(52) U.S. Cl. ............................. 710/313; 710/3
(58) Field of Classification Search .......... 710/313–314, 710/3–6
See application file for complete search history.

(56) References Cited

U.S. PATENT DOCUMENTS

| 2005/0086549 A1* | 4/2005 | Solomon et al. .............. 713/320 |
| 2011/0041105 A1* | 2/2011 | Chou et al. .................... 716/106 |

OTHER PUBLICATIONS

PCI-SIG, *PCI Express™ Base Specification Revision 1.1*, Chapters 1, 2, and 7, Mar. 28, 2005, 263 pages.
International Search Report and Written Opinion, dated Oct. 4, 2011 for PCT Appl. No. PCT/US2011/044048, 8 pages.

* cited by examiner

*Primary Examiner* — Clifford Knoll
(74) *Attorney, Agent, or Firm* — Sterne, Kessler, Goldstein & Fox P.L.L.C.

(57) ABSTRACT

A system and method using messages to access registers and memory in a PCI Express communications link environment. Vendor defined PCI Express messages can be used to read and write to the memory-mapped or register space of a device. Four types of accesses are defined using this messaging approach, namely memory read, memory write, configuration read and configuration write. The type of register access desired is defined by the appropriate value in a vendor-specific type field in the header of the vendor defined message. If a PCI Express compliant device at the other end of the PCI Express link does not support these types of messages, the messages are silently discarded by the receiver and no error is reported.

19 Claims, 11 Drawing Sheets

|   | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
|   | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|   | R | 1 | 1 | 0 | 1 | 0 | 0 | 0 | R | TC | | | R | | | | TD | EP | Attr | | AT | | Length | | | | | | | | | 0x1 |
|   | Requestor ID | | | | | | | | | | | | | | | | Tag | | | | | | | | 0 | 1 | 1 | 1 | 1 | 1 | 1 | 1 |
|   | Route by ID | | | | | | | | | | | | | | | | Vendor ID | | | | | | | | | | | | | | | |
|   | Unused | | | | | | | | | | | | | | | | | | | | | | | | Type | | | | | | | |
|   | Address[31:0] | | | | | | | | | | | | | | | | | | | | | | | | | | | | | | | |

FIG. 2

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | 1 | 1 | 0 | 1 | 0 | 0 | 0 | R | TC | | | R | | | | T D | E P | Attr | | AT | | Length | | | | | | | 0x1 | | |
| Requestor ID | | | | | | | | | | | | | | | | Tag | | | | | | | | 0 | 1 | 1 | 1 | 1 | 1 | 1 | 1 |
| Route by ID | | | | | | | | | | | | | | | | Vendor ID | | | | | | | | | | | | | | | |
| Unused | | | | | | | | | | | | | | | | Register Number | | | | | | | | | | | Type | | | |
| R | | | | | | | | | | | | | | | | | | | | | | | | | | | | | | | R |

FIG. 4

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | 1 | 1 | 0 | 1 | 0 | 0 | 0 | R | TC | | | R | | | | T D | E P | Attr | | AT | | Length | | 0 | 1 | 1 | 1 | 1 | 1 | 1 | 1 |
| Requestor ID | | | | | | | | | | | | | | | | Tag | | | | | | | | 0x2 | | | | | | | |
| Route by ID | | | | | | | | | | | | | | | | Vendor ID | | | | | | | | | | | | | | | |
| Unused | | | | | | | | | | | | | | | | | | | | | | | | Type | | | | | | | |
| R | | | | | | | | Register Number | | | | | | | | | | | | | | | | | | | | | | | R |
| Data[31:0] | | | | | | | | | | | | | | | | | | | | | | | | | | | | | | | |

FIG. 5

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | 1 | 1 | 0 | 1 | 0 | 0 | 0 | R | TC | | | | R | | | T D | E P | Attr | | AT | | Length | | | | | | | | | |
| Requestor ID | | | | | | | | | | | | | | | | Tag | | | | | | | | 0 | 1 | 1 | 1 | 1 | 1 | 1 | 1 |
| Route by ID | | | | | | | | | | | | | | | | Vendor ID | | | | | | | | | | | | | | | |
| Unused | | | | | | | | | | | | | | | | | | | | | | | | Type | | | | | | | |
| Data[31:0] | | | | | | | | | | | | | | | | | | | | | | | | | | | | | | | |

FIG. 6

| PCIE_REG_ACCESS_CNTL [R/W] | | |
|---|---|---|
| Field Name | Bits | Default | Description |
| REG_ACCESS_CAPABILITY Access: R | 1:0 | 0x0 | Identifies the register access through vendor defined messages capability supported by this device. |
| REG_ACCESS_GEN_EN | 2 | 0x0 | Enable the generation of register accesses through vendor defined messages. |
| REG_ACCESS_RCV_DIS | 3 | 0x0 | Disable register accesses through received vendor defined messages. When this capability is disabled, any register access through vendor defined messages are discarded silently by the receiver. By default the processing of received vendor defined messages must be enabled. This disable bit is provided as a debug bit. |
| REG_ACCESS_DONE | 4 | 0x0 | For writes, read back 0 when previous message has been sent. For reads, 0 indicates that read data can be accessed in PCIE_REG_ACCESS_DATA. Clear to abort an outstanding read. |
| REG_ACCESS_TYPE | 8:5 | 0x0 | Type of register access, encoding defined in FIG. 7B below. When this field is programmed, the vendor defined message of type REG_ACCESS_TYPE, with data payload as defined in registers PCIE_REG_ACCESS_ADDRESS and PCIE_REG_ACCESS_DATA is sent. |

FIG. 7A

| Type[3:0] | Definition |
|---|---|
| 0x0 | Memory read |
| 0x1 | Memory write |
| 0x2 | Configuration read |
| 0x3 | Configuration write |
| 0x4 | Completion |
| Others | Reserved |

FIG. 7B

| PCIE_REG_ACCESS_ADDR [R/W] ||||
|---|---|---|---|
| Field Name | Bits | Default | Description |
| REG_ACCESS_ADDRESS | 31:0 | 0x0 | For memory read and write, this is the offset in memory mapped space for register access through vendor defined messages. For config read and write, only bits 9:0 are used for the register offset. |

FIG. 8

| PCIE_REG_ACCESS_DATA [R/W] ||||
|---|---|---|---|
| Field Name | Bits | Default | Description |
| REG_ACCESS_WRITE_DATA | 31:0 | 0x0 | Data for memory mapped write or config write using register access through vendor defined messages. |

FIG. 9

SYSTEM AND METHOD FOR ACCESSING RESOURCES OF A PCI EXPRESS COMPLIANT DEVICE

BACKGROUND

1. Field

The present invention relates generally to data communications, and in particular serial point-to-point data communications.

2. Background Art

The speed of computers has dramatically increased over recent years. A considerable portion of that increase has resulted from the increased CPU speeds. However, computer speed also depends upon the speed of data communications, i.e., the ability for CPUs to communicate data to and from peripheral devices. For some time, the peripheral component interconnect (PCI) bus provided adequate peripheral connectivity. However, with increased CPU speeds and greater data transfer demands, the PCI bus quickly became the slowest link between CPU and peripheral. In particular, the PCI bus imposed substantial pin, power and clocking disadvantages in order to meet the increased data transfer requirements.

In response to these disadvantages, the PCI Express industry standard developed. The PCI Express industry standard adopted a serial protocol that uses low voltage differential signals, does not impose the same clocking disadvantages, and delivers higher bandwidth with reduced pin count. PCI Express offers up to 32 data channels (known as lanes) that provide serial point-to-point connectivity between a "root" device and an "endpoint" device.

The PCI Express protocol is a layered protocol, with the layers including a transaction layer, a data link layer, and a physical layer. The fundamental building block of communication between PCI Express-compliant devices is the transaction layer packet (TLP). The TLP contains a header, a data payload and an error correction segment (called a digest). One or more TLPs create a transaction that enables an operation in a PCI Express-complaint device. For example TLP transactions facilitate memory read and write operations.

As noted above, the PCI Express protocol was developed to offer a flexible high speed approach to the modern data communication device-to-device challenges. Nevertheless, with the ever increasing demand for efficient data transfer to service high performance computer designs, the efficiency of data transfer remains a high priority. Thus, there is an ongoing need for enhancements to the PCI Express protocol. Any improvements to the PCI Express protocol must necessarily be backwards compatible with the standard PCI Express specifications.

As a consequence, device modifications are necessary to permit additional functionality from PCI Express protocol enhancements to be realized. Enhancements to the PCI Express protocol can be realized by upgrades to software drivers associated with the devices at either end of the communications link. Such upgraded software drivers program the memory-mapped space so that the associated devices can capitalize on the PCI Express protocol enhancements. Although upgrades to device software drivers are the preferred solution, very often such upgrades are not available in a timely fashion. Moreover, a PCI Express function is not permitted to access resources (e.g., configuration space) that are not owned by that function. While some limited access of foreign resources in a PCI Express environment may be possible using a peer-to-peer approach, many platforms do not support peer-to-peer access, and very few platforms support "read access" using a peer-to-peer approach. In addition, downstream PCI Express ports do not accept access to configuration space. Further, some systems block peer-to-peer access altogether via "Access Control Services."

Therefore, there is a need for a method and system to implement PCI Express protocol enhancements in the absence of upgrades to associated device software drivers.

BRIEF SUMMARY OF EMBODIMENTS OF THE INVENTION

In an embodiment of the present invention, memory space or register space is configured using vendor defined messages.

In a further embodiment of the present invention, the resources accessing approach is applied using type 1 vendor defined PCI Express messages. Exemplary embodiments of type 1 vendor defined PCI Express messages for memory read, memory write, configuration read, configuration write and completion are described.

An example of a use model using the messaging approach to resource access is also described.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 2 depicts an exemplary memory read vendor defined message definition, according to an embodiment of the present invention.

FIG. 4 depicts an exemplary configuration read vendor defined message definition, according to an embodiment of the present invention.

FIG. 5 depicts an exemplary configuration write vendor defined message definition, according to an embodiment of the present invention.

FIG. 6 depicts an exemplary completion vendor defined message definition, according to an embodiment of the present invention.

FIGS. 7-9 depict exemplary register definitions for the vendor messaging approach to resource access, according to an embodiment of the present invention.

Figure 1:
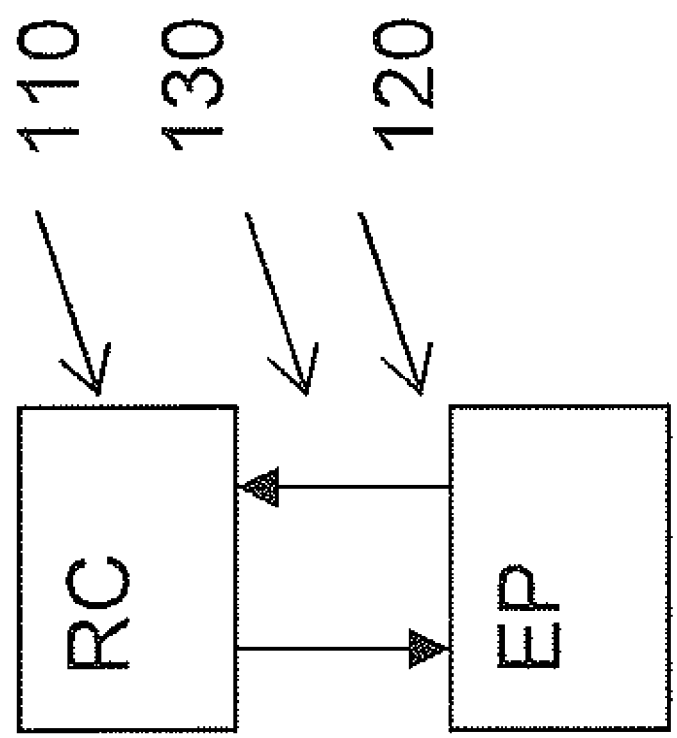
FIG. 1 depicts a data communications system using a PCI Express approach.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF EMBODIMENTS OF THE INVENTION

FIG. 1 depicts a data communications system that uses a PCI Express system for communication between devices 110 and 120. The basic unit of communication in the PCI Express standard is the transaction layer packet (TLP). One or more TLPs establish a PCI Express transaction and are transmitted over link 130 between devices 110 and 120. Devices 110 and 120 typically include a controller to control and manage the PCI Express transactions.

A generic TLP packet contains a header, a data payload and an error checking portion (also known as a digest). The data payload and the digest are optional, since not all TLP packets require a data payload and a digest. The TLP header is aligned as a double word (also known as a DWord), where a DWord equals four bytes or 32 bits. Depending on the particular PCI Express transaction, the TLP header can vary in length (i.e., 3 DWords or 4 DWords long).

As noted above, device modifications are necessary to permit additional functionality from PCI Express protocol enhancements to be realized. Enhancements to the PCI Express protocol can typically be implemented by upgrades to software drivers associated with the devices at either end of the communications link. Such upgraded software drivers program the memory-mapped space associated with the devices can use the PCI Express protocol enhancements. Updated software drivers for each affected PCI Express device (including endpoints, switches and the root complex) are the preferred solution to the need to incorporate PCI Express protocol enhancements. Although upgrades to device software drivers are the preferred solution, very often such upgrades are not available in a timely fashion.

In the approach described below, a generic method is proposed where vendor-defined PCI Express messages are used to read and write to the memory-mapped space (or the configuration space) of the associated device. These vendor defined PCI Express messages are vendor-defined type 1 messages within the PCI Express protocol. By using a vendor-defined type 1 message approach, if a PCI Express compliant device at the other end of the PCI Express link does not support these types of messages, the messages are silently discarded by the receiver and no error is reported. Only one outstanding request at any one time is supported in the approach described below.

Four types of register access are defined using this messaging approach. The four types of register access are memory read, memory write, configuration read and configuration write. The type of register access desired is defined by the appropriate value in a vendor-specific type field in the header of the vendor defined message. As an example of this method, a memory read request works in the following manner. When a memory read request is sent using this approach, the other side of the communications link responds with a vendor specific message indicating type completion, together with a 32-bit data payload. The receiver of the vendor specific message then processes this message and the data will be stored in an associated register, which can later be read by software.

Exemplary Vendor Defined Message for Memory Read

FIGS. 2-6 illustrate the transaction layer packet definitions for vendor-defined type 1 messages used for register access, in accordance with the present invention. FIG. 2 illustrates an exemplary TLP definition for a memory read in a vendor-defined message. As FIG. 2 portrays, the header of the vendor-defined memory read message is composed of four DWords together with a one DWord payload. The first word of the header consists of a first field that is a reserved field, is 1 bit long, and is marked "R." The second field is a 7-bit field contains the value "1110100" that indicates that the TLP is a vendor defined message.

The next field in the first DWord is also a reserved field, is 1 bit long, and is marked "R". The traffic class (TC) field is a three-bit field to identify up to eight different types of traffic classes. Such information can form the basis for the provision of different qualities of service. The next field is also a reserved field, is 4 bits long, and is marked "R." The TD field is a one-bit field that indicates the presence or otherwise of a digest at the end of the TLP packet. Thus, a TD field value of "1" indicates the presence of a digest, while a value of "0" indicates the absence of a digest. The EP field is a one-bit field that indicates whether a TLP packet is considered to contain "bad" data. Thus, an EP field value of "1" indicates the presence of bad data, while a value of "0" indicates the absence of bad data. The "Attr" is a 2-bit field that provides attribute information for the TLP packet, where the attribute information includes information concerning cache coherency and relaxed ordering. The "AT" is a 2-bit field that indicates whether the address in the packet is translated or not if PCI Express address translation services are used.

Finally, the "Length" field is a 10-bit field that provides an indication of the length of the payload in the TLP. The payload length is expressed in DWords. The value of this field is set to a value of "1," which indicates a payload length of 1 DWord in length.

The second DWord of the vendor-defined memory read message contains a "Requester ID" field, a "Tag" field, and a fixed value field. The "Requester ID" field is a 16-bit field that contains the bus number, the device number and the function number of the Requester. The contents of the "Requester ID" field are assigned during the configuration phase and are intended to uniquely identify the Requester in the PCI Express topology.

The "Tag" field is an 8-bit field that is used to uniquely identify a request. In particular, a Requester can create a unique "Tag" field for each of the requests made by the Requester that require a completion. Thus, an associated completion header contains the associated "Requester ID" and "Tag" values so that the Requester can rapidly identify the associated completion header.

The final field in the second DWord of the vendor-defined memory read message is an 8-bit field, with its value fixed to the value of "01111111."

The third DWord of the vendor-defined memory read message contains a "Route by ID" field and a "Vendor ID" field. The "Route by ID" field is a 16-bit field that contains routing information indicating the device that is the intended recipient of the message. The "Vendor ID" field is a 16-bit field that contains identification of the vendor of the device sending the message. The "Vendor ID" is assigned by the PCI Special Interest Group (PCI-SIG).

The fourth DWord of the vendor-defined memory read message contains a 28-bit unused field together with a 4-bit type field. The 4-bit type field indicates the type of access desired. An exemplary set of values for the "Type" field is illustrated in FIG. 7B.

Finally, the fifth DWord of the vendor-defined memory read message is the payload that contains a 32-bit field that indicates the address of the relevant memory space being addressed by the memory read message.

Exemplary Vendor-Defined Message for Memory Write

Figure 3:
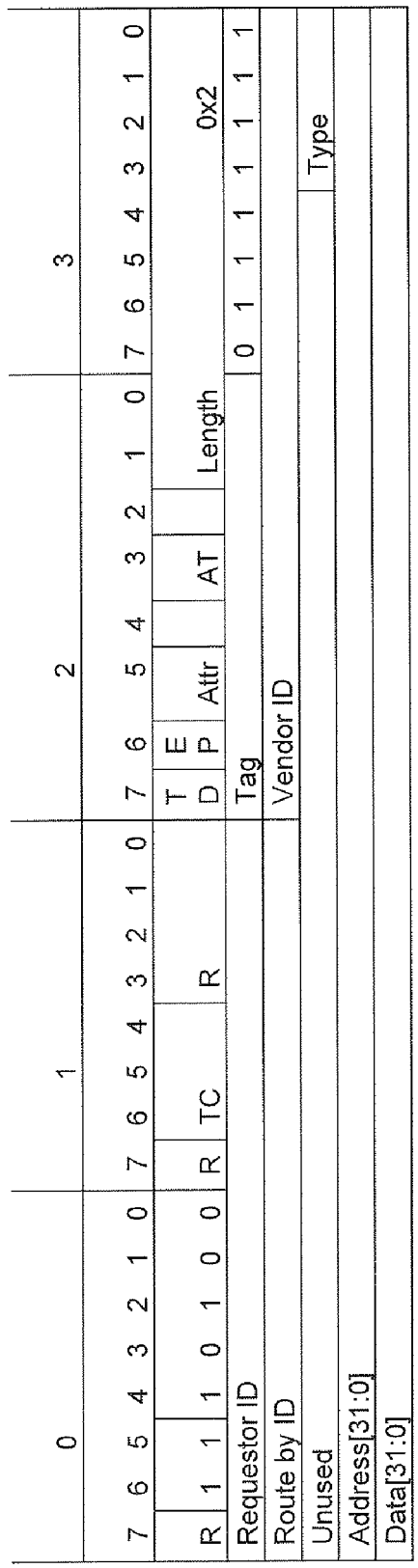
FIG. 3 depicts an exemplary memory write vendor defined message definition, according to an embodiment of the present invention.

FIG. 3 illustrates an exemplary TLP definition for a memory write in a vendor-defined message. As FIG. 3 portrays, the header of the vendor-defined memory write message is composed of four DWords together with a two DWord payload. The first DWord of the header contains the same fields and values as that shown in FIG. 2 for the memory read message. The only difference is that the Length field is set to a value of "2" which indicates a payload length of 2 DWords in length. The next three DWords are identical to that shown in FIG. 2 for the memory read message, with the exception that the type field is set to the value associated with a memory write type message. The payload of the message contains two DWords, with the first DWord containing the 32-bit Address field and the second DWord containing the 32-bit Data field. In an alternative embodiment, the TLP packet can contain addressing information to support addressing of variable length data. In such an embodiment, the payload length is not hardwired to a set value such as 2 (or 1 in the case of a memory read), but instead is set to the length of the data block plus 1. This alternate embodiment can be applied to the memory write, memory read and completion messages.

Exemplary Vendor-Defined Message for Configuration Read

FIG. 4 illustrates an exemplary TLP definition for a configuration read in a vendor-defined message. As FIG. 4 portrays, the header of the vendor-defined configuration read message is composed of four DWords followed by a one DWord payload. The first DWord of the header contains the same fields and values as that shown in FIG. 2 for the memory read message. As with the memory read message, the Length field is set to a value of "1" which indicates a payload length of 1 DWord in length. The next three DWords are identical to that shown in FIG. 2 for the memory read message, with the exception that the type field is set to the value associated with a configuration read type message. The payload of the message contains one DWord, with this DWord containing a 20-bit reserved field, followed by a 10 bit "Register Number" field that indicates the number of the register being read. Finally, the remaining 2-bits constitute a 2-bit reserved field.

Exemplary Vendor-Defined Message for Configuration Write

FIG. 5 illustrates an exemplary TLP definition for a configuration write in a vendor-defined message. As FIG. 5 portrays, the header of the vendor-defined configuration write message is composed of four DWords followed by a two DWord payload. The first DWord of the header contains the same fields and values as that shown in FIG. 2 for the memory read message, with the exception that the Length field is set to a value of "2" which indicates a payload length of 2 DWord in length. The next three DWords are identical to that shown in FIG. 2 for the memory read message, with the exception that the type field is set to the value associated with a configuration write type message. The payload of the message contains two DWords, with the first DWord containing a 20-bit reserved field, followed by a 10 bit "Register Number" field that indicates the number of the register being written. The remaining 2-bits of the first DWord of the payload constitute a 2-bit reserved field. Finally, the second DWord of the payload contains the 32-bit data of the configuration write message.

Exemplary Vendor-Defined Message for Completion

FIG. 6 illustrates an exemplary TLP definition for a completion in a vendor-defined message. As FIG. 6 portrays, the header of the vendor-defined completion read message is composed of four DWords followed by a one DWord payload. The first DWord of the header contains the same fields and values as that shown in FIG. 2 for the memory read message. As with the memory read message, the Length field is set to a value of "1" which indicates a payload length of 1 DWord in length. The next three DWords are identical to that shown in FIG. 2 for the memory read message, with the exception that the type field is set to the value associated with a completion message. The payload of the message contains one DWord, with this DWord containing 32 bits of data.

Exemplary Registry Definitions for Vendor-Defined Messaging Approach

FIGS. 7-9 illustrate exemplary registry definitions in support of the vendor-defined messaging approach. FIG. 7 illustrates exemplary definitions of five (5) fields, as follows: a read-only 2-bit field (REG_ACCESS_CAPABILITY) that identifies a device that supports the capability described, a 1-bit field (REG_ACCESS_GEN_EN) that enables the generation of register access through vendor defined messages, a 1-bit field (REG_ACCESS_RCV_DIS) that, when set, can disable register access via received vendor defined messages, a 1-bit field (REG_ACCESS_DONE) that uses a value of "0" to indicate a previous message has been sent (in the case of a write) and that data can be accessed (in the case of a read), and a 4-bit field (REG_ACCESS_TYPE) that indicates the type of access using the exemplary definitions shown in FIG. 7B. FIG. 8 illustrates an exemplary definition of a 32-bit field (REG_ACCESS_ADDRESS) that provides the offset in memory mapped space for register access through vendor defined messages. For the case of configuration read and configuration write operations, only bits 9:0 of the 32-bit field are used to provide the register offset. FIG. 9 illustrates an exemplary definition of a 32-bit field (REG_ACCESS_WRITE_DATA) that provides the data for memory mapped write or configuration write using register access through vendor defined messages. A read data register is also required to store the received data upon completion of a read operation. In an exemplary embodiment, the read data register can simply be the write data register re-used for the read operation. Alternatively, the read data register can be a separate register altogether, e.g., a 32-bit field (REG_ACCESS_READ_DATA). As noted earlier, embodiments of the present invention include provision for access to flexible lengths of data blocks. In addition, the data blocks can reside in a range of register locations or memory locations.

Method of Using Vendor Defined Message Approach

Figure 10:
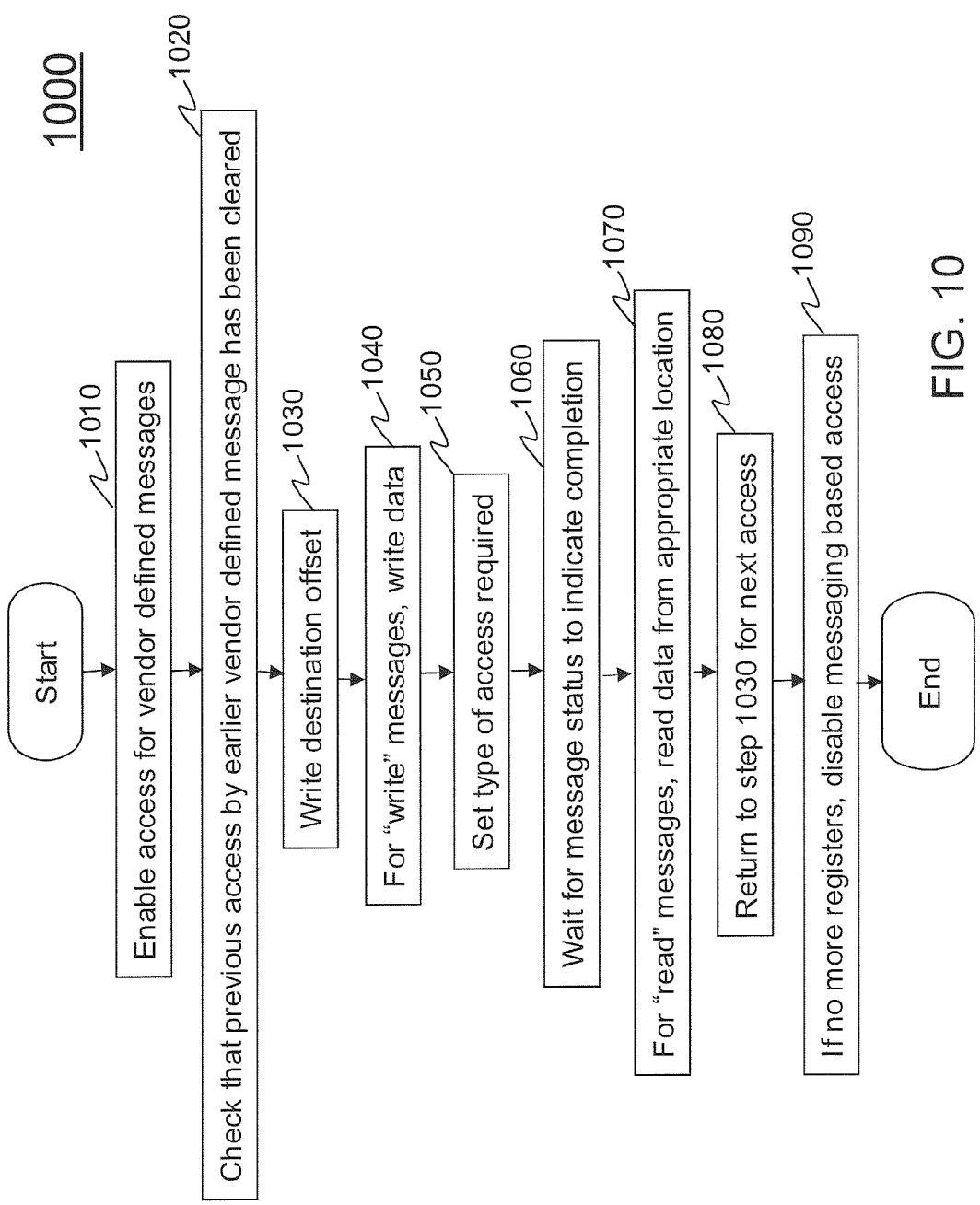
FIG. 10 depicts a flowchart of an exemplary method of resource access using messaging, according to an embodiment of the invention.

FIG. 10 depicts a flowchart 1000 of an exemplary method for the use of a PCI Express vendor defined message approach, according to embodiments of the present invention. FIG. 10 is described with continued reference to the operating environment of FIG. 1. However, method 1000 is not limited to that embodiment. Method 1000 begins at step 1010.

In step 1010, enable resource access at the source for vendor defined messages. In an exemplary embodiment, access can be enabled by setting the REG_ACCESS_GEN_EN field of the PCIE_REG_ACCESS_CNTL register to a value of "1."

In step 1020, check to ensure that previous access by an earlier vendor defined message has been cleared. In an exemplary embodiment, such a check can be made by checking to see that REG_ACCESS_DONE field of the PCIE_REG_ACCESS_CNTL is set to "0."

In step 1030, the destination resource offset is written into an appropriate location associated with the source. In an exemplary embodiment, the destination resource offset is written into the PCIE_REG_ACCESS_ADDR register.

In step 1040, for memory write vendor messages or configuration write vendor messages, write the data into an appropriate location associated with the source. In an exemplary embodiment, the data is written into REG_ACCESS_WRITE_DATE location within the PCIE_REG_ACCESS_DATA register.

In step 1050, set the type of destination access desired. In an exemplary embodiment, set the REG_ACCESS_TYPE field in the PCIE_REG_ACCESS_CNTL to the desired destination access. When the type field is written, the vendor defined message is sent.

In step 1060, wait for the message status to indicate completion of the sending of the vendor defined message. In an exemplary embodiment, one can wait until the REG_ACCESS_DONE value of PCIE_REG_ACCESS_CNTL register is set to a value of "0."

In step 1070, read data from the appropriate location if this was a memory read or configuration read operation through vendor messages. In an exemplary embodiment, data can be read from the location PCIE_REG_ACCESS_DATA.

In step 1080, return to step 1030 and continue with the next destination resource access.

In step 1090, when no further resources require access, disable resource access through vendor defined messages. In an exemplary embodiment, resource access can be disabled by setting REG_ACCESS_GEN_EN in PCIE_REG_ACCESS_CNTL to a value of "0."

Before software can use this resource access request through vendor defined message method, the software needs to determine that the other side of the communications link supports this feature. Software can do this by using this method to do a read of configuration space address 0 (vendor/device ID). This will cause a vendor defined message, of type 0x2 (i.e., configuration read), to register offset 0, to be sent to the other side. If this request is successful, and software can read the vendor/device ID in PCIE_REG_ACCESS_DATA, then this method is supported and software can proceed to use this method. If PCIE_REG_ACCESS_CNTL.REG_ACCESS DONE=1 even after the timeout value set in software, then this method is not supported and cannot be used. In an exemplary embodiment, this step can be performed following step 1010.

As noted earlier, that as per the PCI Express specification, if the other side of a communications link does not support this mechanism, and does not understand the vendor defined message, the message must be silently discarded at the receiver.

Figure 11:
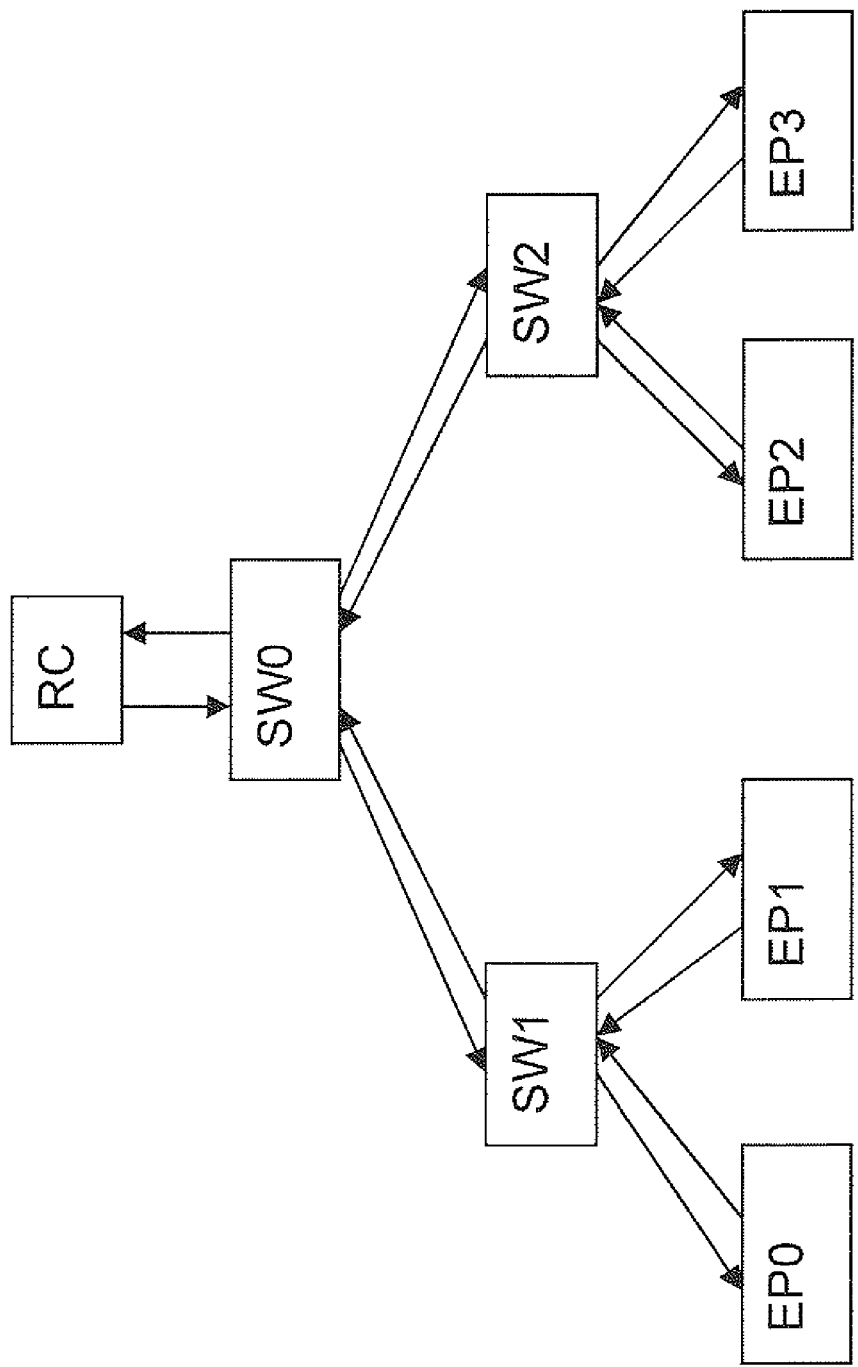
FIG. 11 depicts a PCI Express topology with four end points, a root complex and three switches.

The above method can be readily extended to more complex topologies that involve multiple end devices, as shown for example in FIG. 11. For example, the root controller, all switches and end points in FIG. 11 would support the message-based approach to memory access.

Note also that these vendor defined messages terminate at the receiver and are not forwarded by a switch (i.e., routing [2:0]=100b). For example, in FIG. 11, if EP0 needs to access the registers of SW0, it must do it in a multi-step process. For example, for EP0 to do a memory write to SW0, program EP0 to send a memory write through vendor defined message upstream to SW1. This write from EP0 programs the PCIE_REG_ACCESS* registers of SW1, which will in turn, trigger SW1 to send a memory write through vendor defined message upstream to SW0. Such a single-step propagation mode is inefficient. In an alternative and more efficient multi-step embodiment, the messages can be routed by ID (i.e., routing [2:0]=010b). Using such a routing, the messages can propagate through the switch to their final destination. An additional register location (e.g., REG_ACCESS_ROUTE_APPROACH) is required to indicate which of the two vendor propagation methods is to be used.

Persons of ordinary skill in the relevant art(s) will recognize that the scope of the embodiments of the present invention is not limited to the specific exemplary encodings provided in this description. In particular, embodiments of the present invention can be used with alternate encodings that implement a reduced header approach in a PCI Express topology. Further, embodiments of the present invention can be used with versions, including future versions, of the PCI Express standard. In addition, embodiments of the present invention are also applicable to other data transaction standards, both present and future.

The invention can work with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Conclusion

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A method for accessing a functional space of a destination using a message originating from a source, comprising:
    forming the message at the source, wherein the message is a vendor-defined message based on an indication provided in a vendor-specific type field defined in an associated message standard, and the message includes an access type value associated with an access and a destination offset value associated with the functional space; and
    sending the message to the destination.

2. The method according to claim 1, wherein the message is a PCI Express message.

3. The method according to claim 1, wherein the access is one of a memory read operation, a memory write operation, a configuration read operation, a configuration write operation and a completion operation.

4. The method according to claim 1, wherein the message further includes a data value and the access is one of a memory write operation, a configuration write operation and a completion operation.

5. The method according to claim 1, wherein the functional space is one of a memory location and a register location.

6. The method according to claim 1, wherein the forming and the sending are performed when an enablement location associated with the source is set to a value indicating messaging enablement.

7. The method according to claim 1, further comprising:
indicating the message has been successfully sent by setting a status location associated with the source to a predetermined value.

8. The method according to claim 1, further comprising:
indicating the message has been successfully sent by noting an availability of data to be read.

9. The method according to claim 1, wherein the forming and the sending are performed after verifying a prior message formation at the source has completed.

10. The method according to claim 1, wherein the forming a message further includes a route value set to a predetermined routing value associated with a single-step propagation.

11. The method according to claim 1, wherein the forming a message further includes a route value set to a predetermined routing value associated with a multi-step propagation.

12. A method for accessing a functional space of a destination using a message originating from a source, comprising:
receiving the message at the destination, wherein the message is a vendor-defined message based on an indication provided in a vendor-specific type field defined in an associated message standard, and the message includes an access type value associated with an access and a destination offset value associated with the functional space; and
performing the access at the functional space based on the destination offset value and the access type value.

13. The method according to claim 12, wherein the message is a PCI Express message.

14. The method according to claim 12, wherein the access is one of a memory read operation, a memory write operation, a configuration read operation, a configuration write operation and a completion operation.

15. The method according to claim 12, wherein the message further includes a data value and the access is one of a memory write operation, a configuration write operation and a completion operation.

16. The method according to claim 12, wherein the functional space is one of a memory location and a register location.

17. The method according to claim 12, wherein the performing the access occurs when a register value at the destination is set to a predetermined value indicating message enablement.

18. An apparatus for accessing a functional space of a destination using a message originating from a source, comprising:
a digital device configured to form the message at the source, wherein the message is a vendor-defined message based on an indication provided in a vendor-specific type field defined in an associated message standard, and the message includes an access type value associated with the accessing and a destination offset value associated with the functional space of the destination.

19. An apparatus for accessing a functional space of a destination using a message originating from a source, comprising:
a digital device configured to receive the message at the destination, wherein the message is a vendor-defined message based on an indication provided in a vendor-specific type field defined in an associated message standard, and the message includes an access type value associated with the accessing and a destination offset value associated with the functional space of the destination,
wherein the digital device is further configured to access the functional space based on the destination offset value and the access type value.

* * * * *